Aug. 21, 1951  D. E. CULVER ET AL  2,564,961
SPECTACLE FRAME HAVING INTERCHANGEABLE PARTS
Filed April 9, 1947  2 Sheets-Sheet 1
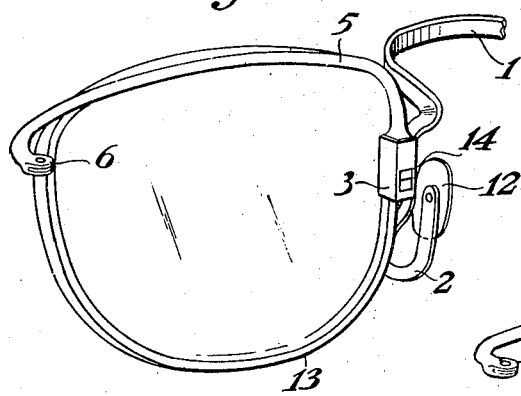
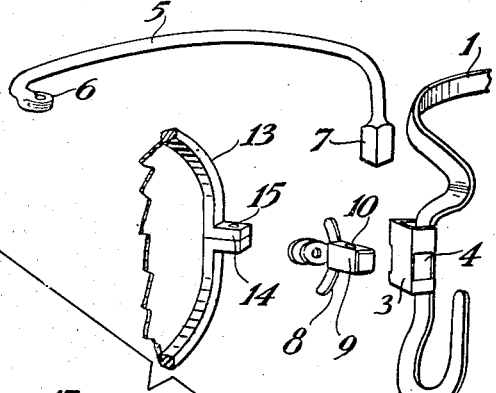
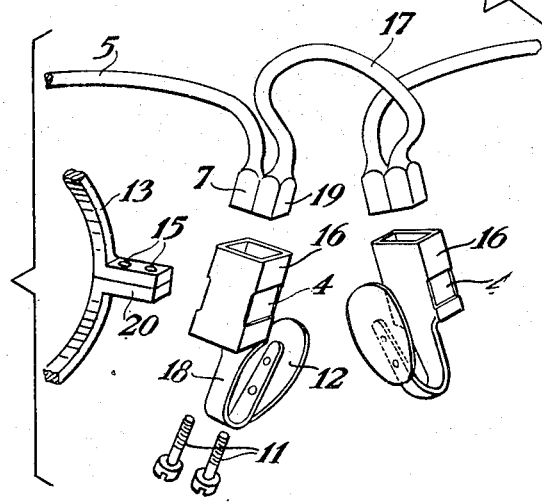
Inventors:
Douglas Edward Culver and
Reginald Bayliss;
By their attorneys,
Baldwin, Wight, & Brevoet Aug. 21, 1951  D. E. CULVER ET AL  2,564,961
SPECTACLE FRAME HAVING INTERCHANGEABLE PARTS
Filed April 9, 1947  2 Sheets-Sheet 2

Inventors:
Douglas Edward Culver
and
Reginald Bayliss;
By their attorneys,
Baldwin, Wright, & Prevost Patented Aug. 21, 1951

2,564,961

UNITED STATES PATENT OFFICE 2,564,961

SPECTACLE FRAME HAVING INTER-CHANGEABLE PARTS

Douglas Edward Culver, Tippendell Lane, near St. Albans, and Reginald Bayliss, London, England Application April 9, 1947, Serial No. 740,338
In Great Britain September 28, 1945

Section 1, Public Law 690, August 8, 1946
Patent expires September 28, 1965

3 Claims. (Cl. 88—41)

The invention relates to spectacle frames and is directed to a unit construction by means of which an optician can supply a wide variety of styles and sizes of spectacle frames to suit different wearers with the use of only a moderate range of parts to be kept in stock.

According to the invention a spectacle frame is built up of two lens-supporting members, two side-supporting wires, and a bridge piece, each lens-supporting member, its associated side-supporting wire, and the appropriate part of the bridge piece being united by means of a box having open ends and a hole in one side, into which a lug at the back or side of the lens-supporting member fits, while at least one of the other members has an end shaped to fit into an open end of the box, the whole being clamped together by screw means acting in the longitudinal direction of the box.

Usually the hole in the box passes transversely through two opposite sides, but it may pass through one side only, especially if the cross section of the box is other than rectangular, such as of D-shape or circular.

The invention is illustrated by the accompanying drawing, in which

Figure 1 is an exploded view to show the parts for building up a spectacle frame in accordance with the invention.

Figure 4 is an exploded view of an alternative construction, and

Figure 2:
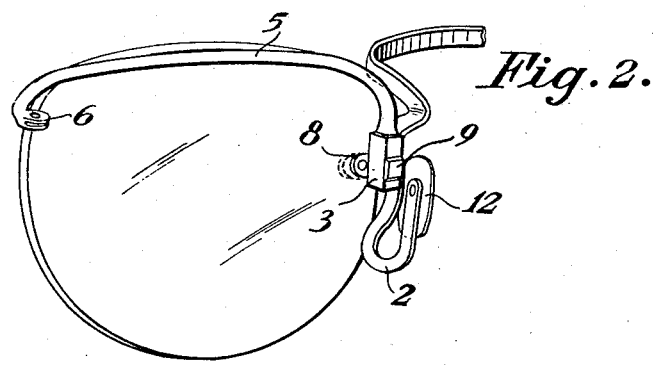
Figure 2 shows the parts assembled with rimless lenses, Figure 3 corresponds to Figure 2 but with the lenses mounted in rims.

Referring first to Figure 1, a bridge piece 1, of which only the left half is shown, is bent to shape from strip metal and has a U-shaped lower extension 2 to carry a placquet. Where the bridge piece 1 is normally attached to the remainder of the frame, this member carries a rectangular box 3 having its top and bottom open and a rectangular hole 4 passing through it from back to front. The box 3 is preferably made as to three sides of a separate piece of metal, its free edges being soldered to the edges of the strip 1, which itself constitutes the fourth side of the box.

A side-supporting wire 5, which is a temple-supporting brace arm, is adapted to lie along and behind the upper edge of the lens and has the usual hinge point at 6 for the side piece. Its other end part 7 is enlarged into a rectangular block to fit into the top end of the box 3. A rimless strap 8 is provided with a solid rectangular lug part 9 projecting rearwards and having a plain hole 10 passing through it from top to bottom.

To assemble the parts the lug 9 of the rimless strap is pushed into the hole 4 in the box 3, and the end 7 of the wire 5 is pushed down into the top of the box 3. The whole is made tight by a screw 11 passing up through an aperture in the lower end of the box 3 and through the hole 10 in the lug 9 into a hole tapped in the clamping end part 7 of the wire 5. The screw is of such dimensions that the head just comes flush with the lower end of the box 3 when it is screwed home. The left half of the assembled spectacles is shown in Figure 2 with the placquet 12 added but without the side piece.

If spectacles with rims are required, the rim 13 can be made as shown in Figure 1 having a single piece to encircle the lens. The rim is split at the part shown and terminates in the two parts of a split lug 14. A clearance hole 15 passes through both parts of the lug 14. In the position shown in Figure 1 the rim holds the lens fast, but the ends can be sprung apart a little to remove or insert the lens. Assembly is effected as in the previous case, but the screw 11, in addition to the functions previously described, holds the two parts of the lug 14 together and thus retains the lens in place. Figure 3 shows the left half of a pair of spectacles assembled in this manner.

It will be seen that the lens is gripped by the drawing together of the two parts of the lug, as is the case with known spectacle frames in which a lateral split lug also constitutes one member of a side hinge. The present arrangement differs from the one referred to in that the lug has clearance holes for the screw 11 and the two parts are held together by pressure between the head of the screw and the shaped end 7 of the side-supporting wire.

The parts shown in Figure 1 are common to both forms of frame, except the actual rim 13 and the rimless strap 8. If then a wearer has rimless spectacles and finds them unsuitable, it is a simple matter for the optician to remove the rimless strap 8 and replace it by a rim 13 without making any alteration to the remainder of the frame.

The box 3 could alternatively be made an integral part of the supporting wire 5, a square or other rectangular part like 7 being fixed to the bridge piece 1. It is probable, however, that this form of construction will generally be found less convenient than the one illustrated.

Another form of construction, which may be found advantageous in some cases, is shown in Figure 4. The box 16 is separate from the bridge piece 17 and the side-supporting wire 5, but has a downward extension 18 bent upwards to carry a placquet 12. The side-supporting wire 5 has a solid rectangular end 7 as before, and the bridge piece 17 also has a similar end 19 to fit into the box 16 side by side with the end 7. The lug 20 of the frame 13 is longer than in the case of Figure 1 and has two holes 15, 15, through which two screws 11, 11 are screwed into the ends 7 and 19 respectively. The assembled frame would differ only slightly in appearance from Figure 1 or 2.

Figure 5:
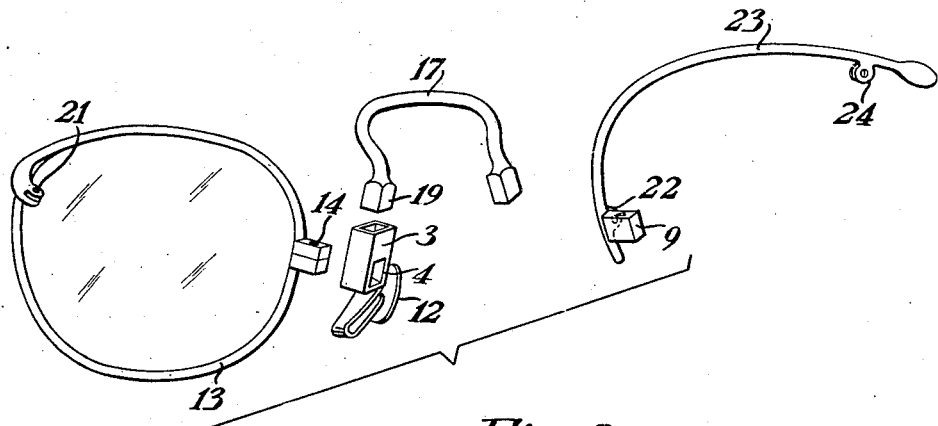
Figure 5 is an exploded view of a further alternative construction.

The construction shown in Figure 5 differs from the previous ones in the absence of the wire 5. A box 3 is adapted to take the square end 19 of a bridge piece 17 and carries a placquet 12. The lens rim 13 has a lug 14 to fit into a hole 4 in the box 3 as before. The joint 21 for the side is soldered with a long splice to the back edge of the eye wire at the temple end.

For a rimless arrangement, the strap 22 carries a side-supporting wire 23 with an additional strap 24, or the parts 23 and 24 can be omitted, the side being attached in the usual way to the outer edge of the lens.

It is understood that an optician would keep in stock a number of each of the component parts, viz. rim (or rimless strap), bridge piece and side supporting wire, also, in the case of Figure 4, pairs of boxes 16 with placquets, and that each would be in a variety of sizes, shapes and styles and perhaps in different materials, so that a very wide range of different frames could be produced from a moderate stock of parts.

The description given above of specific forms of construction was in each case for an all-metal frame. Of course some parts can be replaced by other materials with corresponding changes in the details and methods of manufacture.

What we claim is:

1. A lens mounting comprising a generally vertical, hollow, rectangular box carried by a bridge-piece, said box being open at its upper end and open at its lower end and having a generally rectangular opening in a side wall intermediate said ends, a lens-holding means having a generally horizontal and rectangular projection occupying said intermediate opening and extending into the box, a temple-supporting brace arm having a rectangular extremity disposed in the open upper end of the box abutting and superposed on said projection, said projection having a vertical hole in line with said rectangular extremity, and a screw bearing against the lower end of the box, said screw passing into the box through the latter end, through said hole and being threaded to said rectangular extremity to compactly secure the mentioned parts together.

2. A lens mounting according to claim 1 wherein said bridge-piece has a rectangular extremity also disposed in the open upper end of the box abutting and superposed on said projection, said projection having a second vertical hole, said second vertical hole being in line with said vertical extremity of the bridge-piece, a second screw, and said second screw bearing against the lower open end of the box and passing into the box through said lower open end, said second mentioned hole and the said vertical extremity of the bridge piece.

3. A lens mounting according to claim 1 in which the box has a downward extension carrying a placquet.

DOUGLAS EDWARD CULVER.
REGINALD BAYLISS.

REFERENCES CITED

The following references are of record in the file of this patent:

UNITED STATES PATENTS

| Number | Name | Date |
|---|---|---|
| 906,360 | Alexander | Dec. 8, 1908 |
| 1,055,904 | Hansen | Mar. 11, 1913 |
| 1,062,777 | Fox | Mar. 7, 1913 |
| 1,952,847 | Eaton | Mar. 27, 1934 |
| 1,960,451 | Pappert | May 29, 1934 |
| 2,196,872 | Pomeranz | Apr. 9, 1940 |
| 2,366,659 | Uhlmann et al. | June 21, 1945 |
| 2,382,980 | Eaton et al. | Aug. 21, 1945 |